US007451166B2

(12) United States Patent
Damani et al.

(10) Patent No.: US 7,451,166 B2
(45) Date of Patent: Nov. 11, 2008

(54) SYSTEM AND METHOD FOR MAINTAINING CHECKPOINTS OF A KEYED DATA STRUCTURE USING A SEQUENTIAL LOG

(75) Inventors: Om Prakash Damani, White Plains, NY (US); Robert Evan Strom, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 11/035,359

(22) Filed: Jan. 13, 2005

(65) Prior Publication Data

US 2006/0156064 A1   Jul. 13, 2006

(51) Int. Cl.
*G06F 12/00* (2006.01)
(52) U.S. Cl. .................. 707/201; 707/101; 707/202
(58) Field of Classification Search .................. 707/101, 707/201, 202, 203; 711/112, 133, 159, 161, 711/162, 216
See application file for complete search history.

(56) References Cited

U.S. PATENT DOCUMENTS 5,043,866 A * 8/1991 Myre et al. .................. 707/202
5,561,795 A * 10/1996 Sarkar ......................... 707/202
6,098,078 A * 8/2000 Gehani et al. ............... 707/203
6,629,198 B2 * 9/2003 Howard et al. .............. 711/112

OTHER PUBLICATIONS

Rosenblum et al., "The Design and Implementation of a Log-Structured File System", ACM Transactions on Computer Systems, vol. 10, No. 1, Feb. 1992, pp. 26-52.

* cited by examiner

*Primary Examiner*—John Cottingham
*Assistant Examiner*—Jason L Alvesteffer
(74) *Attorney, Agent, or Firm*—Duke W. Yee; Mark Wardas; Theodore D. Fay, III

(57) ABSTRACT

A system and method for maintaining checkpoints of a keyed data structure using a sequential log are provided. The system and method are built upon the idea of writing all updates to a keyed data structure in a physically sequential location. The system and method make use of a two-stage operation. In a first stage, various values of the same key are combined such that only the latest value in a given checkpoint interval is maintained for writing to persistent storage. In a second stage of the operation, a periodic write operation is performed to actually store the latest values for the key-value pairs to a persistent storage. All such updates to key-value pairs are written to the end of a sequential log. This minimizes the physical storage input/output (I/O) overhead for the write operations. Data structures are provided for identifying the most current entries in the sequential log for each key-value pair.

27 Claims, 7 Drawing Sheets

SYSTEM AND METHOD FOR MAINTAINING CHECKPOINTS OF A KEYED DATA STRUCTURE USING A SEQUENTIAL LOG

BACKGROUND OF THE INVENTION

1. Technical Field

The present invention is generally directed to an improved data processing system. More specifically, the present invention is directed to a system and method for maintaining checkpoints of keyed data structures using a sequential log.

2. Description of Related Art

Many application processes need a mechanism to store their local state in persistent storage to ensure that data is available across process crashes. If the states consist of a collection of key-value pairs, then a database system, such as DB2, Oracle, MySQL, etc., can be used to store the local state of the application processes. In such cases, the database system stores the local state of a process every time the state of the process changes. Thus, all intermittent values of key-value pairs associated with a process are stored in the database system.

However, in some cases, the local state may only need to be stored intermittently for performance reasons. In such cases, "soft checkpoints" may be generated in order to provide a point in time at which the local state of a process was known and events occurring after the "soft checkpoint" may be replayed in order to restore the current local state of the process.

An example of where a soft checkpoint is used is where there is already a persistent log from the beginning. By taking a soft checkpoint, the state can be reconstructed more quickly by restoring the checkpoint and replaying only the input events subsequent to the checkpoint. Therefore, the soft check point does not add to the resilience of the application, but allows event logs to be reclaimed and reduces the amount of work needed to restore the local state. With soft checkpoints, the data need not be saved persistently every time it changes and is rarely read since it is only needed to reduce the work needed to recover from a failure.

The usual database solutions for storing local states of processes are designed to optimize performance for high rates of read queries. Since soft checkpoints are only performed intermittently and are rarely read, known database solutions are not an optimum solution for storing local states of processes. Therefore, it would be beneficial to have an improved system and method for maintaining checkpoints of a keyed data structure, optimized for reducing the cost of updating the checkpoint during failure-free operation.

SUMMARY OF THE INVENTION

The present invention provides a system and method for maintaining checkpoints of a keyed data structure using a sequential log. The mechanisms of the present invention are built upon the idea of writing all updates to a keyed data structure in a physically sequential location. The mechanisms of the present invention make use of a two-stage operation. In a first stage which takes place in main memory between writes to persistent storage, various values of the same key are combined such that only the latest value in a given checkpoint interval is maintained for writing to persistent storage.

In a second stage of the operation, a periodic write operation is performed to actually store the latest values for the key-value pairs to a persistent storage. All such updates to key-value pairs are written to the end of a sequential log. This minimizes the physical storage input/output (I/O) overhead for the write operations. Data structures are provided for identifying the most current entries in the sequential log for each key-value pair. These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
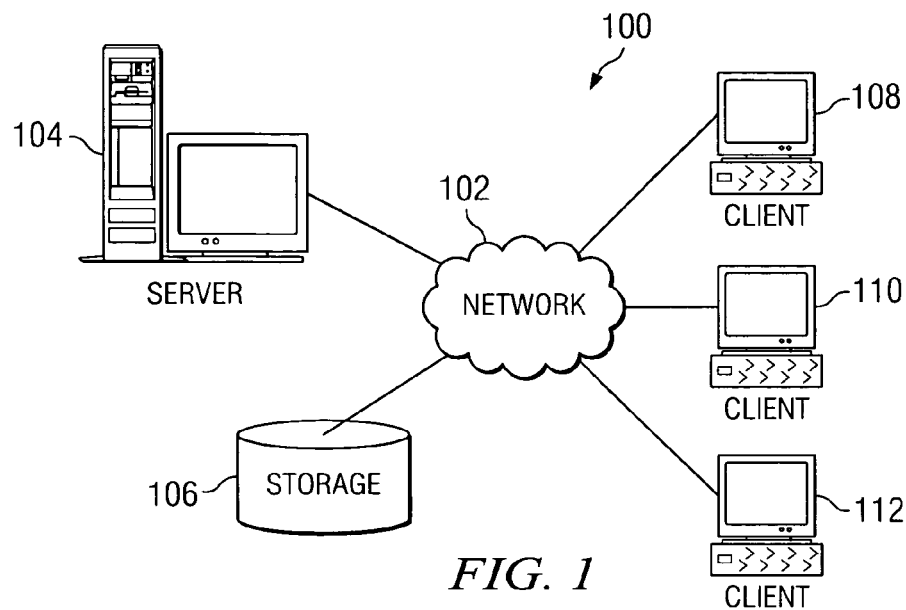
FIG. 1 is an exemplary diagram illustrating a distributed data processing environment in which aspects of the present invention may be implemented.
Figure 2:
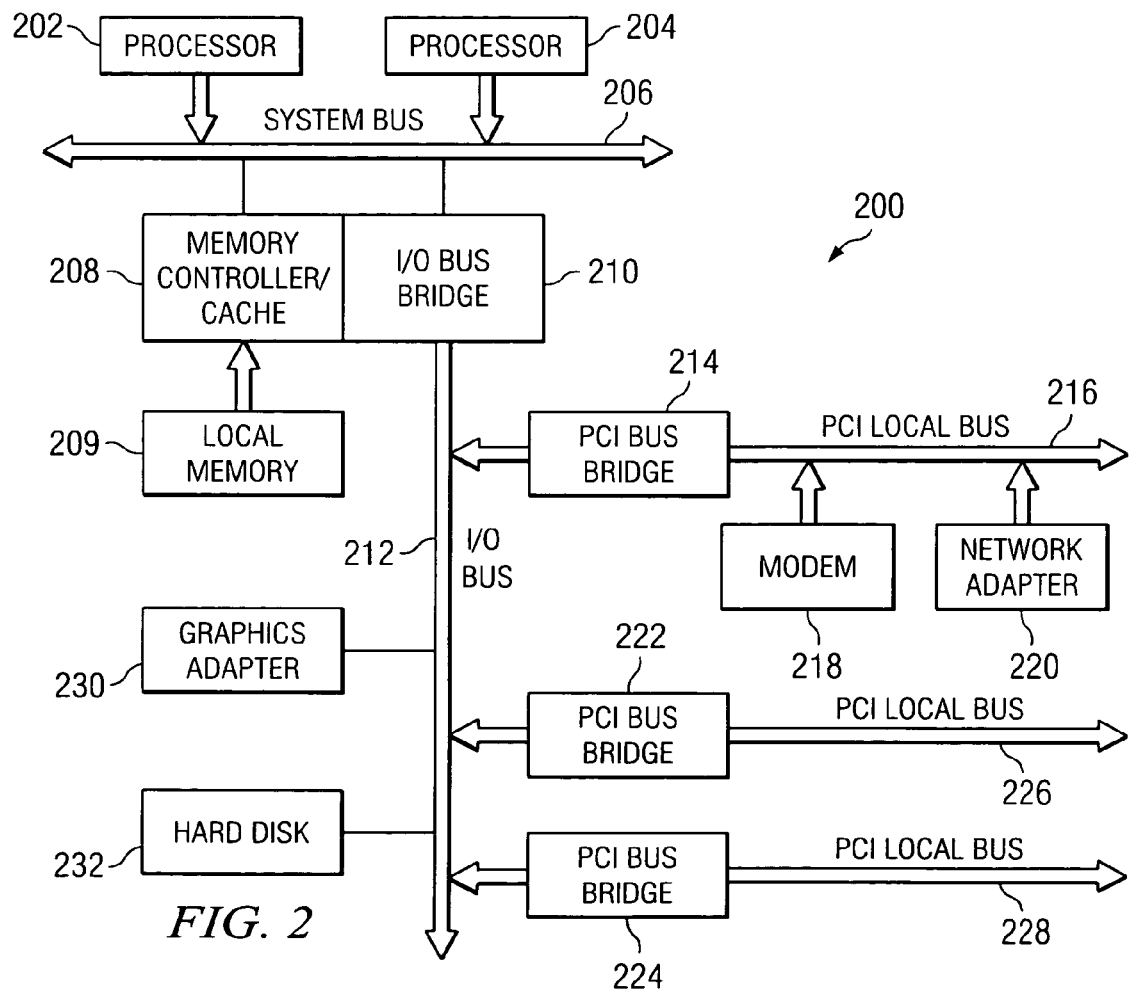
FIG. 2 is an exemplary diagram illustrating a server computing device in which aspects of the present invention may be implemented.
Figure 3:
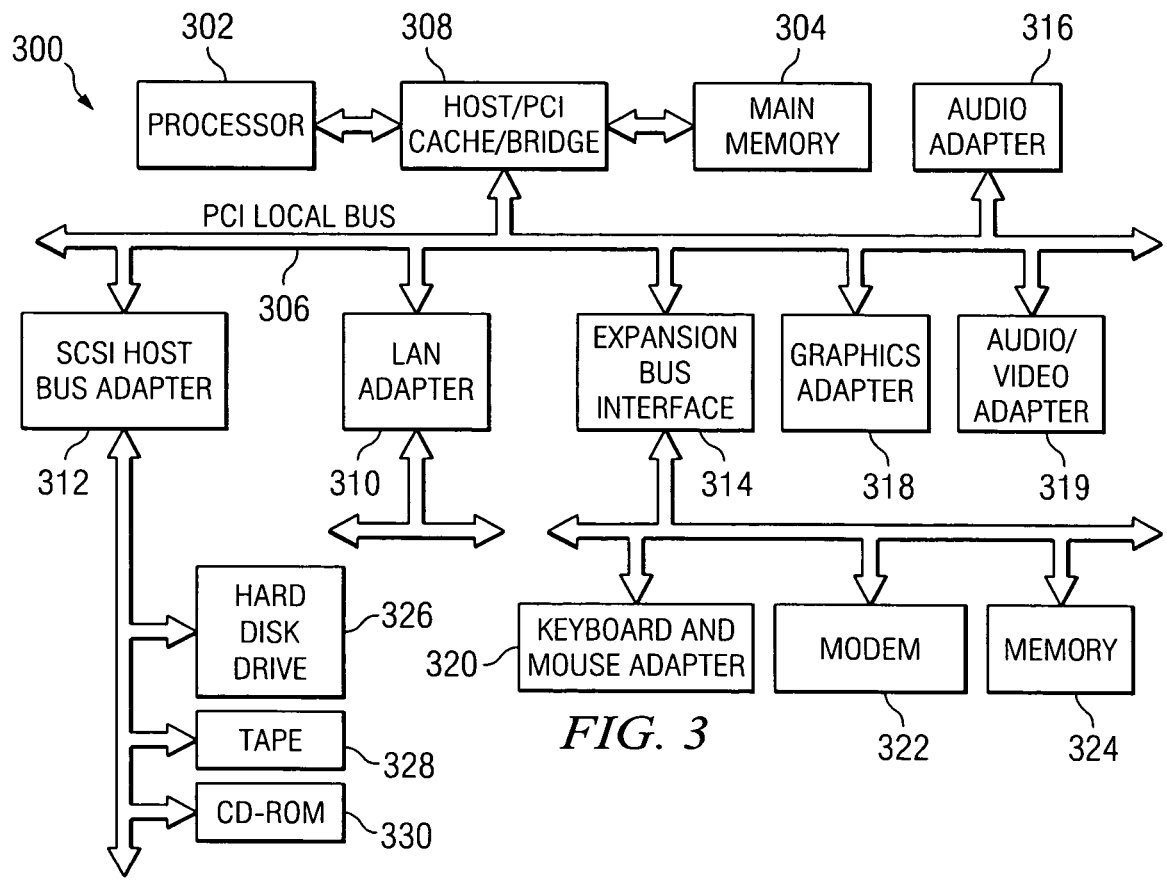
FIG. 3 is an exemplary diagram illustrating a client computing device in which aspects of the present invention may be implemented.

The present invention provides a mechanism for maintaining checkpoints of a keyed data structure using a sequential log. The present invention may be implemented in a distributed data processing environment or in a stand-alone computing device. Therefore, FIGS. 1-3 are provided as examples of the possible data processing environments and computing devices in which aspects of the present invention may be implemented. FIGS. 1-3 are only exemplary and are not intended to state or imply any limitation as to the particular data processing environments and computing devices in which the present invention may be implemented. To the contrary, many modifications may be made to the data processing environments and computing devices illustrated in FIGS. 1-3 without departing from the spirit and scope of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As mentioned above, the present invention provides a system and method for maintaining checkpoints of a keyed data structure using a sequential log. This keyed data structure, held in main memory, forms part of the state of a user's application or a system application for which it is important to be resilient to failures. If the system 300 crashes, losing main memory contents, the state will be recovered by first restoring an earlier value of the keyed data structure from a "soft checkpoint" on persistent storage. Then those external events which occurred between the time the soft checkpoint was taken and the time of the failure are replayed to recover the state of the main memory. The present invention deals with improving the efficiency of maintaining the soft checkpoint The mechanisms of the present invention are built upon the idea of writing all updates to a keyed data structure in a physically sequential manner. The mechanisms of the present invention make use of a two-stage operation. In a first stage, various values of the same key are combined such that only the latest value in a given checkpoint interval is maintained for writing to persistent storage. In a second stage of the operation, a periodic write operation is performed to actually store the latest values for the key-value pairs to a persistent storage. All such updates to key-value pairs are written to the end of a sequential log. This minimizes the physical storage input/output (I/O) overhead for the write operations.

With the present invention, keyed data structures are saved by taking incremental checkpoints. That is, the states of keyed data structures that have changed since a last saving action are stored periodically into persistent storage. This periodic storing of changed states of the keyed data structures involves aggregating data in main memory between writes to persistent storage, periodic writing of changed parts of the aggregated data to the persistent storage in a sequential fashion, i.e. in a sequential log, reclaiming a portion of the sequential log that is no longer needed, and occasional reading of all of the data from the persistent storage. These operations are described in greater detail hereafter.

In a traditional database system, different key-value pairs may reside in different pages of storage. Thus, saving n key-value pairs may involve O(n) page writes. With the present invention, saving n key-value pairs only requires O(n/m) page writes where m is the number of key-values that can be stored in a page. This is because with the present invention only the most current value for the key-value pairs are written and the write is performed to a sequential log. Not all of the intermittent values for the key-value pairs are stored, thereby reducing the amount of storage space necessary to store the key-value pairs and reducing the number of page writes needed to maintain the key-value pairs.

Figure 4:
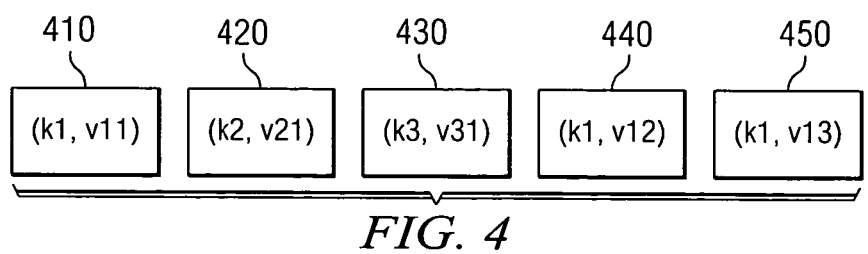
FIG. 4 is an exemplary diagram illustrating successive key-value pairs observed by an application process.

FIG. 4 is an exemplary diagram illustrating successive key-value pairs observed by an application process. As shown in FIG. 4, each key-value pair includes a key identifier, e.g., k1, k2, k3, and so on, and a corresponding value, e.g., v11, v21, v21, etc. Thus, the key-value pair 410 has a key identifier k1 with a corresponding value of v11. The key-value pair 420 has a key identifier k2 and a corresponding value v21. The key-value pair 430 has a key identifier k3 and a corresponding value v31.

The key-value pairs 440 and 450 represent changes to the data value of the key-value pair 410. That is, key-value pair 440 represents a change of the data value v11 associated with key k1 to be the data value v12. Similarly, the key-value pair 450 represents a change of the data value v12 associated with the key k1 to be the data value v13.

The goal of the present invention is to provide a mechanism for taking a snap-shot of these data values, i.e., to save these data values efficiently on a persistent storage, e.g., a hard disk. The present invention is premised on the fact that these data values need not be saved persistently every time the data values change since it is only needed to reduce the work needed to recover from a failure. These snap-shots of the data values may be used with a system in which an event log is maintained such that if a failure occurs, the snap-shot may be used to identify a state of the system at a particular time prior to the failure and the event log may be used to replay the events from the time point of the snap-shot to a present time to thereby recover the state of the system.

Thus, the present invention provides a mechanism for storing the state of key-value pairs that have changed since a last time that the data value for the key-value pair was stored. For example, rather than storing each of the data values v11, v12 and v13 associated with the key k1 in FIG. 4, the present invention may store the data value for the key-value pair 410 and then store the value for the key-value pair 450 without storing the data value of the key value pair 440. In order to provide a mechanism for storing such data values of key-value pairs, the present invention makes use of various data structures which will be described in greater detail with reference to FIG. 5.

Figure 5:
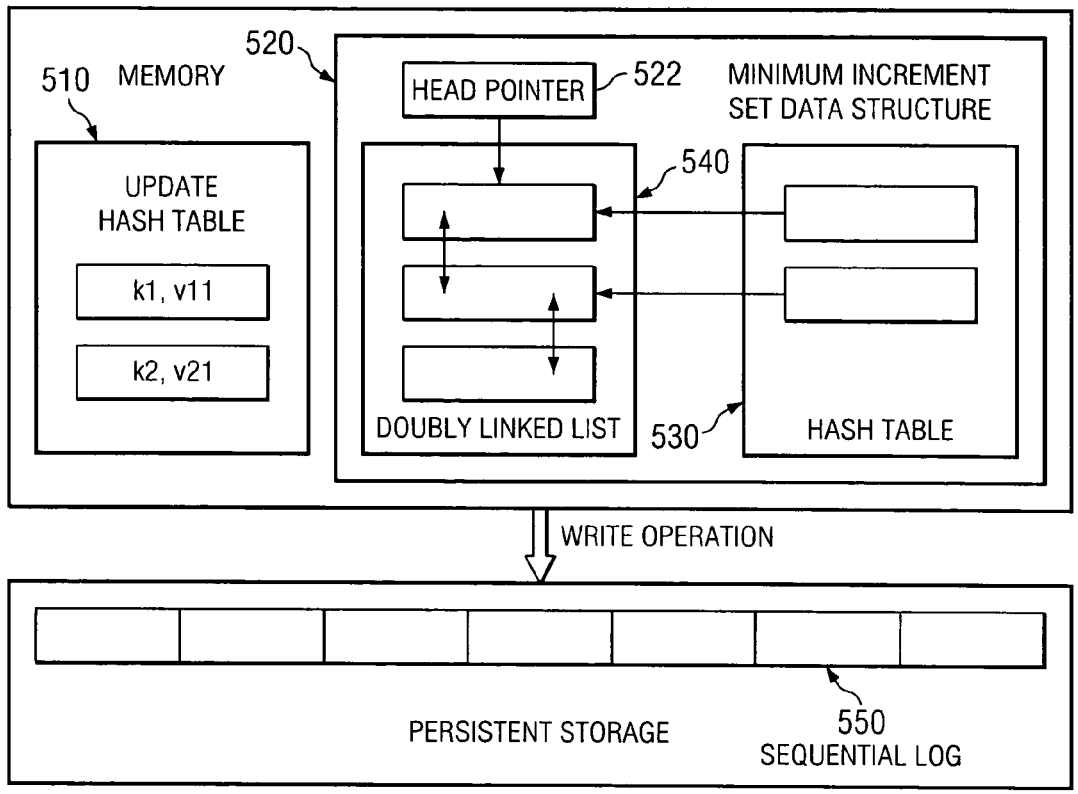
FIG. 5 is an exemplary diagram illustrating data structures utilized by one exemplary embodiment of the present invention to maintain state information for application processes.

FIG. 5 is an exemplary diagram illustrating data structures utilized by one exemplary embodiment of the present invention to maintain state information for application processes. As shown in FIG. 5, the data structures that are maintained by the present invention include an update hash table 510, a minimum increment set data structure 520, and a sequential log data structure 550. The minimum increment set data structure 520 includes a hash table data structure 530 and a doubly linked list data structure 540. The data structures 510-540 may be maintained, for example, in a memory such as local memory 209, while the sequential log data structure 550 may be maintained in persistent storage, such as hard disk 232, for example. The operations of the present invention, as discussed hereafter, may be performed by a data processing device, such as processor 202 or 204, by a memory controller, such as memory controller 208, by an I/O controller, in firmware, or any other suitable data processing device depending upon the particular implementation of the present invention.

The hash table 510 is used to aggregate data in memory between writes to the sequential log data structure 550 in persistent storage. The hash table 510 is created by using a hashing function to hash the keys, i.e. key identifiers, of the key-value pairs into hash buckets. When an update to a key-value pair is made, the key is hashed to look up the appropriate bucket corresponding to the key-value pair. Each bucket stores only a single entry for a key-value pair. Thus, the old data value associated with the key is replaced by the updated data value using the hash table 510. Use of the hash table 510 ensures that for every key, only the latest corresponding data value is maintained.

Figure 6:
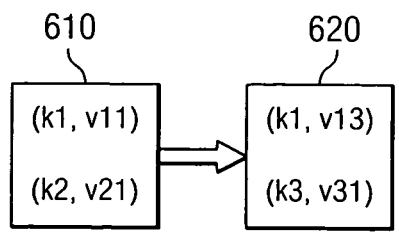
FIG. 6 is an exemplary diagram illustrating aggregation of data in hash table entries between writes to a persistent storage sequential log.

FIG. 6 is an exemplary diagram illustrating aggregation of data in hash table entries between writes to a persistent storage sequential log. A shown in FIG. 6, element 610 represents the aggregated data state in hash table 510 after data value (k2, v21) has been stored in memory. Thus, the hash table 510 stores hash table entries for key k1 corresponding to data value v11 and key k2 corresponding to data value v21.

At some later time after the data values corresponding to hash table state 610 have been written to the sequential log 550 in persistent storage, the hash table 510 is modified to have a state as shown in element 620. As shown, this later state includes a hash table entry for key k1 corresponding to data value v13 and a hash stable entry for k3 corresponding to data value v31. It should be noted that for key k1, the hash table 510 does not store the intermediate value v12 but only the latest value v13. Furthermore, once the data values corresponding to the hash table entries are written to the sequential log 550 in persistent storage, the hash table 510 is cleared of the hash table entries corresponding to the data values written to the sequential log 550. As a result, the hash table entry for key k2 is no longer present in the hash table 510.

Returning to FIG. 5, the minimum increment set data structure 520 is provided to manage the writing of data values to the sequential log 550 in persistent storage. The minimum increment set data structure 520 includes the doubly linked list 540 and a hash table 530. A pointer 522 is provided in the minimum increment set data structure 520 which points to the head of the doubly linked list 540. The hash table 530 contains one entry for every key that has been seen by the application or process. The position of the data value in the sequential log 550 for the key is identified by an entry in the doubly linked list 540. The entry in the doubly linked list 540 is a node that contains a pointer to the latest position of the key's data value in the sequential log 550 in persistent storage and is a sorted list of the latest positions of all keys on the sequential log 550. The hash table 530 contains the key-node pair for every key seen by the application or process.

When a data value corresponding to a key is written to the sequential log 550 in persistent storage, the data value is appended to the end of the sequential log 550. Thus, if a first data value v11 for the key k1 is written to the sequential log 550, a subsequent change to the data value, i.e. a new value v13, for the key k1 will be appended to the end of the sequential log 550 rather than overwriting the first data value of key k1. As new data values for a key are written to the sequential log 550, the position of these new data values is updated in the doubly linked list 540 such that the entry or node in the doubly linked list 540 corresponding to the key now points to the new position in the sequential log 550 storing the most recent data value for the key-value pair. The updating of the entry or node in the doubly linked list 540 is performed using the hash table 530 to identify the entry or node in the doubly linked list 540 for the particular key. That is, a hash function is applied to the key corresponding to the data value written to the sequential log 550 so that a hash table entry in the hash table 530 is identified. This hash table entry includes a pointer to the entry/node in the doubly linked list 540 corresponding to the key. As a result, the position pointer in the entry/node of the doubly linked list 540 is updated to point to the new location in the sequential log 550 where the most current data value associated with the key is stored.

The pointer 522 always points to the entry/node in the doubly linked list 540 that corresponds to the earliest position in the sequential log 550 that contains useful data. That is, as entries in the hash table 510 are written to the sequential log 550, their key values are hashed to identify entries in the hash table 530 and thus, entries/nodes in the doubly linked list 540. If an entry/node in the doubly linked list 540 is modified, and the pointer 522 points to that entry, the pointer 522 is shifted to a next entry/node in the doubly linked list 540. Since the sequential log 550 is written to in a sequential manner, this shifting of the pointer 522 ensures that the pointer 522 always points to the earliest position in the sequential log 550 where useful data is stored. Any entries in the sequential log 550 that appear prior to this position in the sequential log 550 hold data that is no longer in use and this storage may be reclaimed.

Thus, through the use of the data structures illustrated in FIG. 5, the most current state of periodically updated key-value pairs of a system may be identified in a sequential log. The hash table 510 aggregates key-value pair data values between writes of data values to persistent storage. The data values aggregated in the hash table 510 may be periodically written to the sequential log 550 in the persistent storage. The minimum increment set data structure 520 provides a mechanism for identifying the positions of the most current data values for keys in the sequential log 550 as well as the earliest position in the sequential log 550 where useful data is stored. The minimum increment set data structure 520 permits identification of portions of the sequential log 550 that may be reclaimed.

When needed, the entire sequential log 550 may be read to get all of the key-value pairs' current state. This may be needed, for example, when a process restarts after a system crash or other error. The sequential log 550 may be read in a sequential fashion from the beginning to the end with subsequent data values for a key overriding any earlier read data values for that key. Since portions of the sequential log 550 that no longer contain useful data are reclaimed, the occurrences where a key may have multiple values stored in the sequential log 550 at different positions is relatively small.

Alternatively, rather than reading the sequential log 550 in its entirety, the minimum increment set data structure 520 may be used to identify those portions of the sequential log 550 that contain the most current data values for the keys of the key-value pairs. Since the hash table 530 contains one entry for each key seen by an application or process and points to a doubly linked list 540 entry/node corresponding to that key, the position point in the doubly linked list 540 entry/node for each key may be used to identify the most current data value location in the sequential list 550 for each key. These data values may then be read from those identified locations in the sequential log 550.

Figure 7:
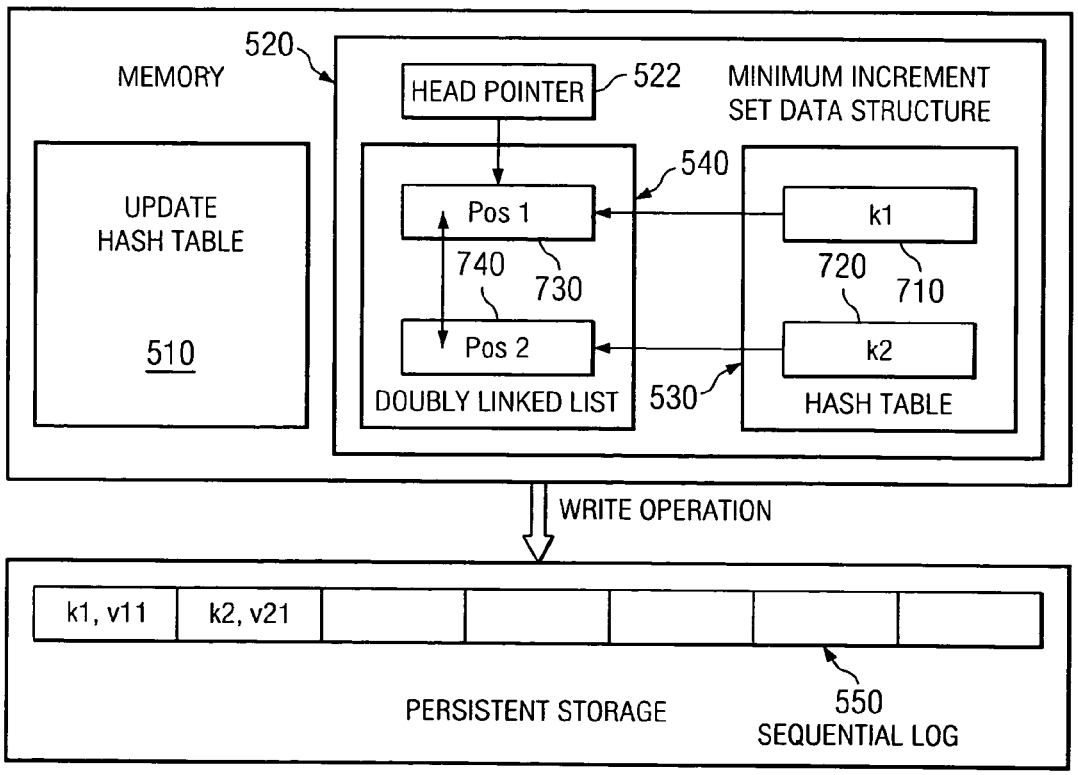
FIG. 7 is an exemplary diagram illustrating a state of the data structures illustrated in FIG. 5 after the hash table entries have been written to a persistent storage sequential log.

As mentioned above, the data values in the hash table 510 are periodically written to the sequential log 550 in persistent storage. FIG. 7 is an exemplary diagram illustrating a state of the data structures illustrated in FIG. 5 after the hash table 510 entries have been written to the sequential log 550. As shown in FIG. 7, the entries (k1, v11, and (k2, v21) have been written to positions 1 and 2, e.g., storage addresses 1 and 2, respectively, in sequential log 550 and the hash table 510 entries have been cleared. In addition, the keys, and the position of each key's most current data value in the sequential log 550, are stored in the minimum increment set data structure 520. The key-position pair are stored in a hash table 530 entry based on a hash of the key while the contents of the hash table 530 are linked together using the doubly linked list 540. The doubly linked list 540 is maintained such that the position of the head of the doubly linked list 540, as identified by pointer 522, is always the earliest useful position in the sequential log 550.

As shown in FIG. 7, the results of these operations are that the hash table 530 contains entries 710 and 720 for keys k1 and k2. These entries are linked to nodes 730 and 740 in the doubly linked list 540. The nodes 730 and 740 contain pointers to positions 1 and 2 in sequential log 550. The head pointer 522 points to node 730 since node 730 is the earliest position in the sequential log 550 where useful data may be found.

Figure 8:
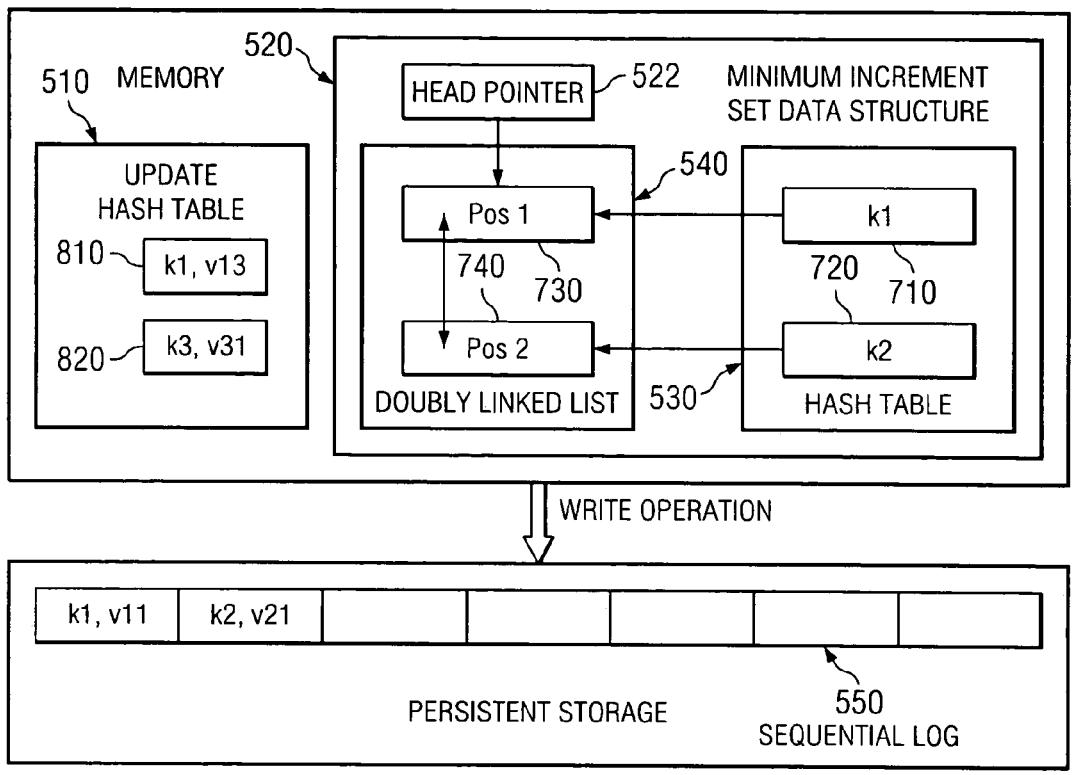
FIG. 8 is an exemplary diagram illustrating a state of the data structures illustrated in FIG. 7 prior to a next write of the hash table entries to a persistent storage sequential log.

FIG. 8 is an exemplary diagram illustrating a state of the data structures illustrated in FIG. 7 prior to a next write of the hash table entries to a persistent storage sequential log. As shown in FIG. 8, following the writing of the hash table 510 entries to the sequential log 550, additional updates to key-value pairs are written to the hash table 510. Thus, for example, an update 810 to the key-value pair corresponding to key k1 is written to the hash table 510 such that the key-value pair is now (k1, v13). It should be noted that a previous update of the data value for k1 such that the key-value pair was (k1, v12) has been overwritten by the update 810 since only the latest update to the key-value pair is maintained in the hash table 510.

Similarly, a new key-value pair 820 is written to the hash table 510. The state of the system shown in FIG. 8 is after writing of the hash table 510 entries to the sequential log 550, as depicted in FIG. 7, but prior to a next periodic writing of the hash table 510 entries to the sequential log 550. Thus, while new entries have been added to hash table 510, the minimum increment set data structure 520 has not been updated or modified based on these new entries to the hash table 510. The minimum increment set data structure 520 is only updated when there is a write of the hash table 510 entries to the sequential log 550 in persistent storage.

Figure 9:
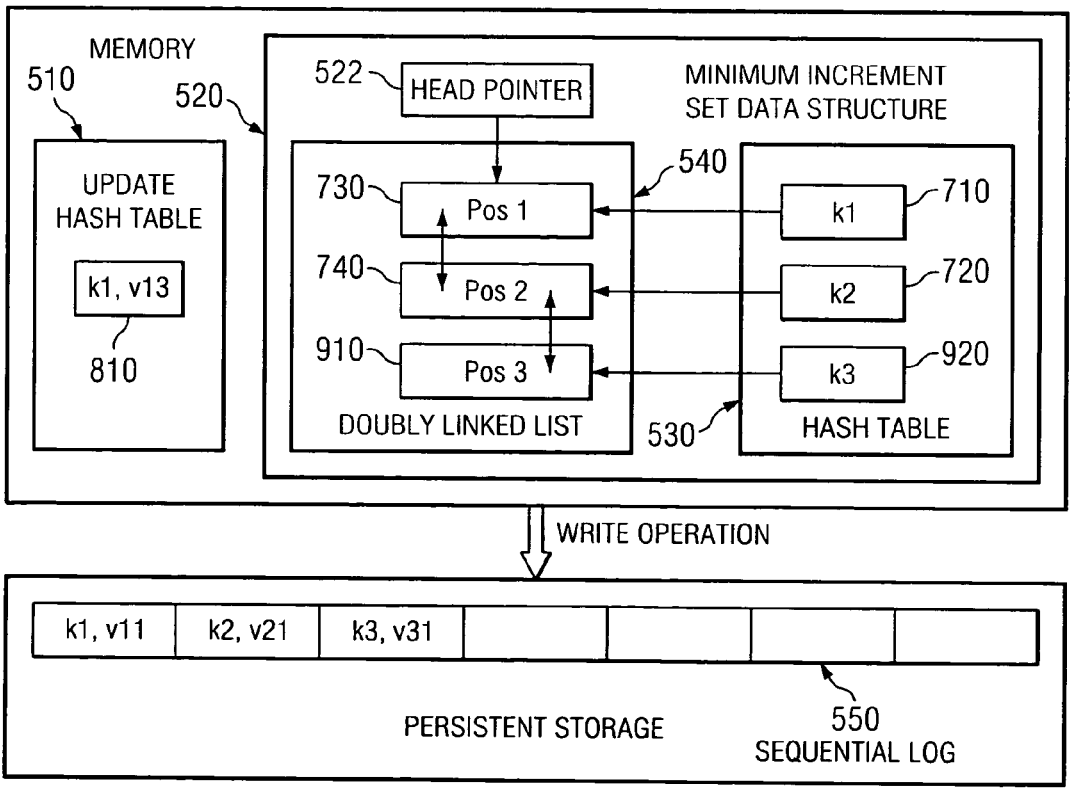
FIG. 9 is an exemplary diagram illustrating a state of the data structures illustrated in FIG. 8 after a hash table entry has been written to a persistent storage sequential log.

FIG. 9 is an exemplary diagram illustrating a state of the data structures illustrated in FIG. 8 after a hash table entry has been written to a persistent storage sequential log. As shown in FIG. 9, when the next periodic writing of hash table 510 entries to the sequential log 550 is commenced, the key-value pair (k3, v31) is written to position 3 in the sequential log 550. In addition, the minimum increment set data structure 520 is updated to include an entry/node in the doubly linked list 540 having a pointer to position 3 in the sequential log 550 and an entry in hash table 530 identifying the key-node pair associated with position 3 in the sequential log 550. Since position 1 is still the earliest position in the sequential log 550 where there is useful data, the head pointer 522 is not modified.

Figure 10:
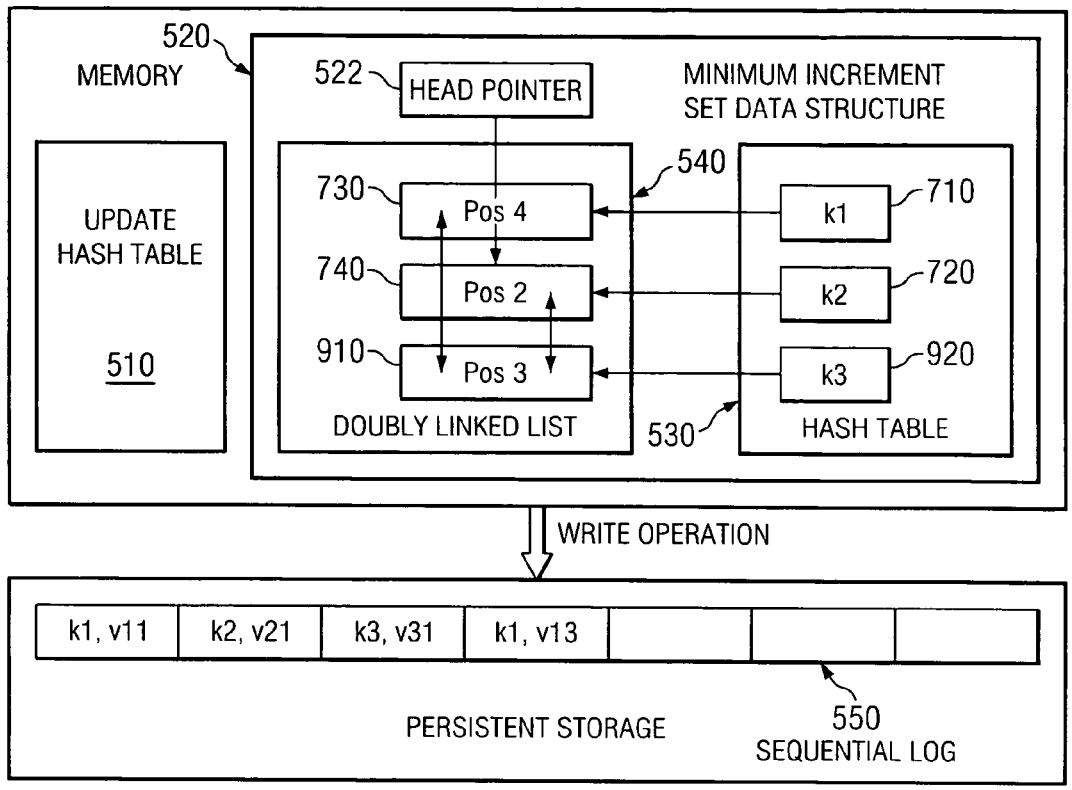
FIG. 10 is an exemplary diagram illustrating a state of the data structures illustrated in FIG. 9 after a second hash table entry has been written to a persistent storage sequential log.

FIG. 10 is an exemplary diagram illustrating a state of the data structures illustrated in FIG. 9 after a second hash table entry has been written to a persistent storage sequential log. After writing of the key-value pair (k3, v31) to the sequential log 550 and updating of the minimum increment set data structure 520, the next entry in the hash table 510, i.e. key-value pair (k1, v13) is written to the sequential log 550 at position 4. As mentioned above, entries are always written to the sequential log 550 in a sequential manner. Thus, even though key-value pair (k1, v13) has the same key value as the entry in position 1 of the sequential log 550, a new entry is added to the sequential log 550 to store this key-value pair.

With the writing of key-value pair (k1, v13) to position 4, the minimum increment set data structure 520 is updated such that the entry/node in the doubly linked list 540 for key value k1 is modified to point to position 4. This updating of the entry/node in the doubly linked list 540 may be performed by deleting the previous entry/node and generating a new node with a pointer value pointing to position 4 in the sequential log 550, and then appending the newly created node back to the doubly linked list 540, for example. The entry in hash table 530 corresponding to the key k1 may then be updated to point to the newly created node.

Alternatively, a new pointer may be written to the existing node which then points to position 4 in the sequential log 540. The hash table 530 entry corresponding to k1 still points to the appropriate node in the doubly linked list 540 and thus, an update to the hash table 530 is not necessary.

The head pointer 522 is then shifted to point to the next entry/node in the doubly linked list 540 that points to a position in the sequential log 550 where useful data is stored. This head pointer 522 is used to determine which portions of the sequential log 550 may be reclaimed. Those portions of the sequential log 550 that are located prior to the position corresponding to the head pointer 522 are considered able to be reclaimed.

Figure 11:
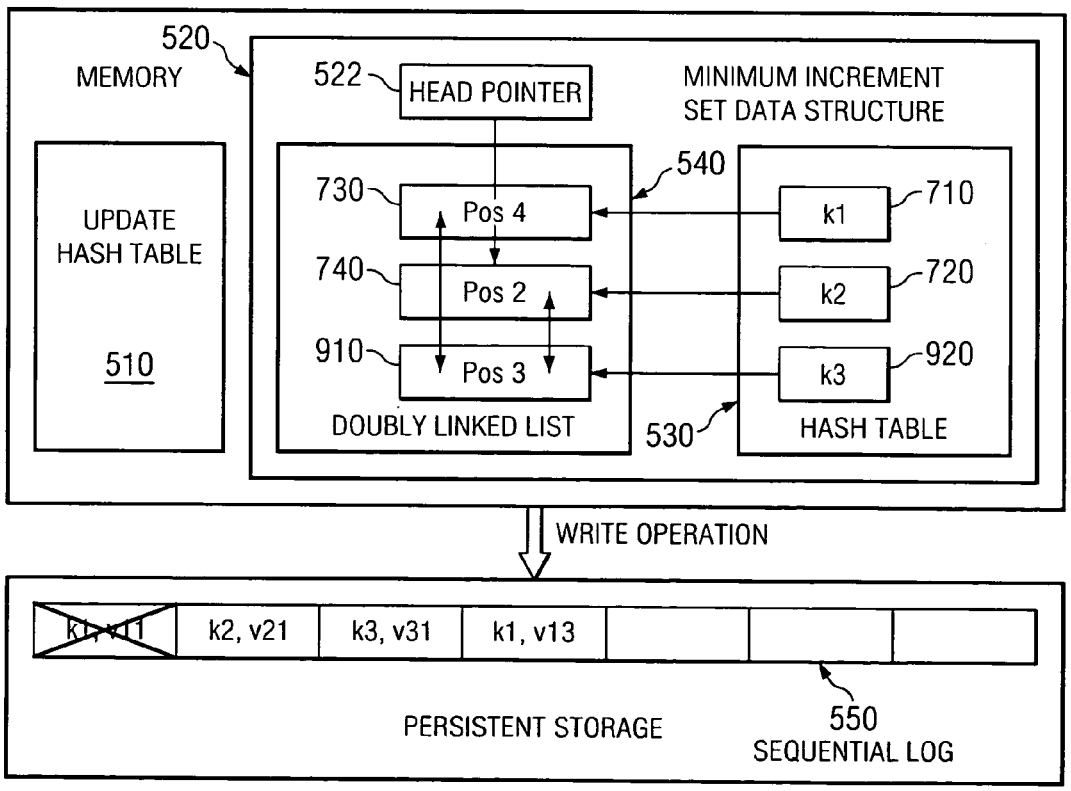
FIG. 11 is an exemplary diagram illustrating log reclamation in accordance with one exemplary embodiment of the present invention.

FIG. 11 is an exemplary diagram illustrating log reclamation in accordance with one exemplary embodiment of the present invention. When a key-value pair is written to the sequential log 550 in persistent storage, any earlier value for that key is no longer needed. This implies that the prior entries for this key in the sequential log 550 may be discarded. Therefore, it is necessary to keep track of the earliest position in the sequential log 550 that contains useful data. This earliest position is the same as the minimum of all maximum positions for given keys. That is, formally, this relationship is written, the earliest useful position=minimum(for all keys k:max(all log positions where key=k)).

As shown in FIG. 11 since the data value for k1 has been updated such that the current data value for key k1 is now stored at position 4 in the sequential log 550, and the minimum increment set data structure 530 is updated accordingly, the head pointer 522 now points to position 2 as the earliest position in the sequential log 550 where useful data is stored. As a result, the data stored in position 1 of the sequential log 550 is no longer necessary. Thus, the storage space associated with position 1 in the sequential log 550 may be reclaimed.

As mentioned above, the entire sequential log 550 may be read to get the current state of all of the key-value pairs seen by an application or process. By reading these states from the sequential log 550 a snap-shot of the state of the key-value pairs at a particular point in time is made possible. From this snap-shot, operations occurring after this point in time may be replayed, using an event log for example, so that the current state of the application or process may be recreated following a process crash.

Figure 12:
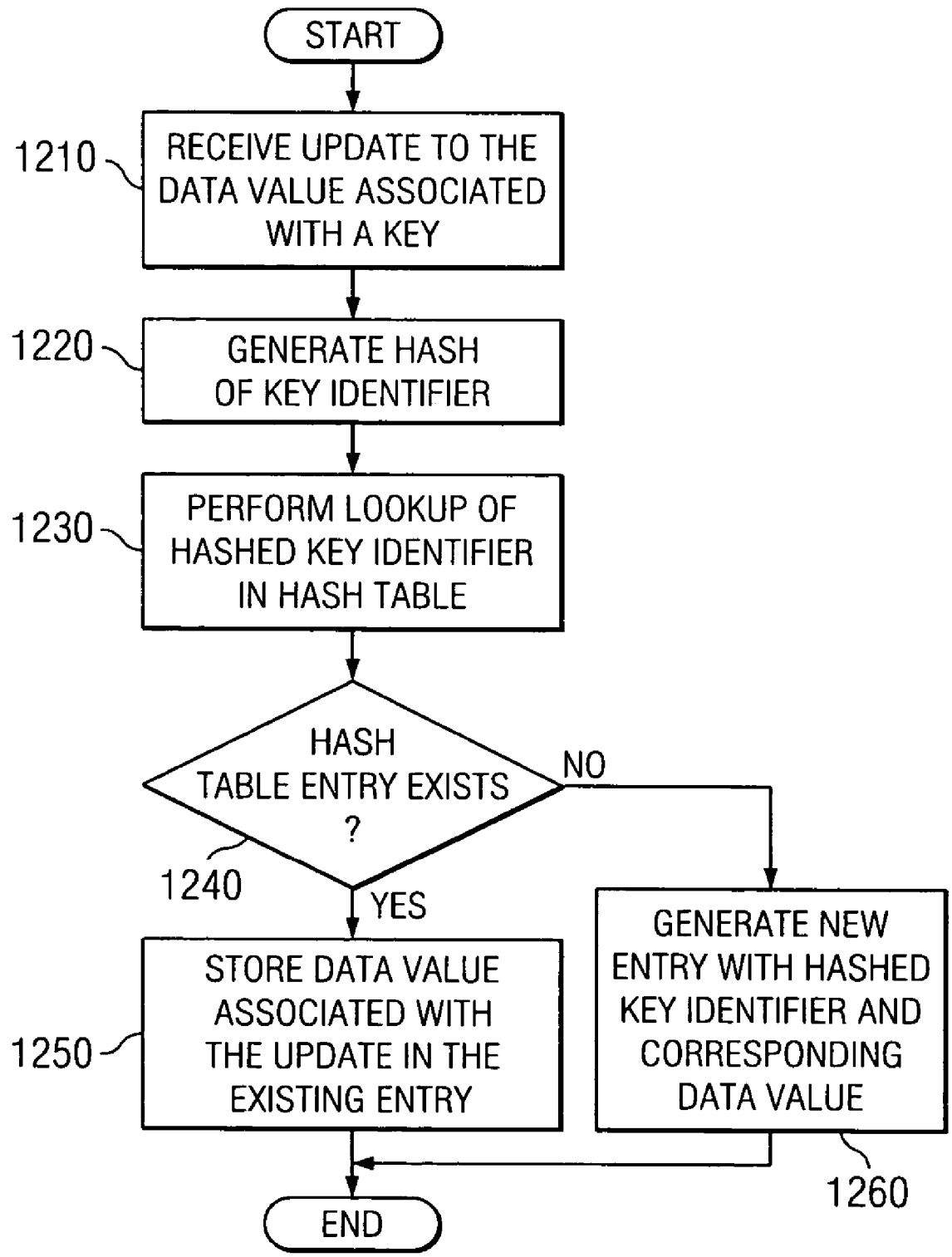
FIG. 12 is a flowchart outlining an exemplary operation of the present invention when aggregating updates to a key-value pair.
Figure 13:
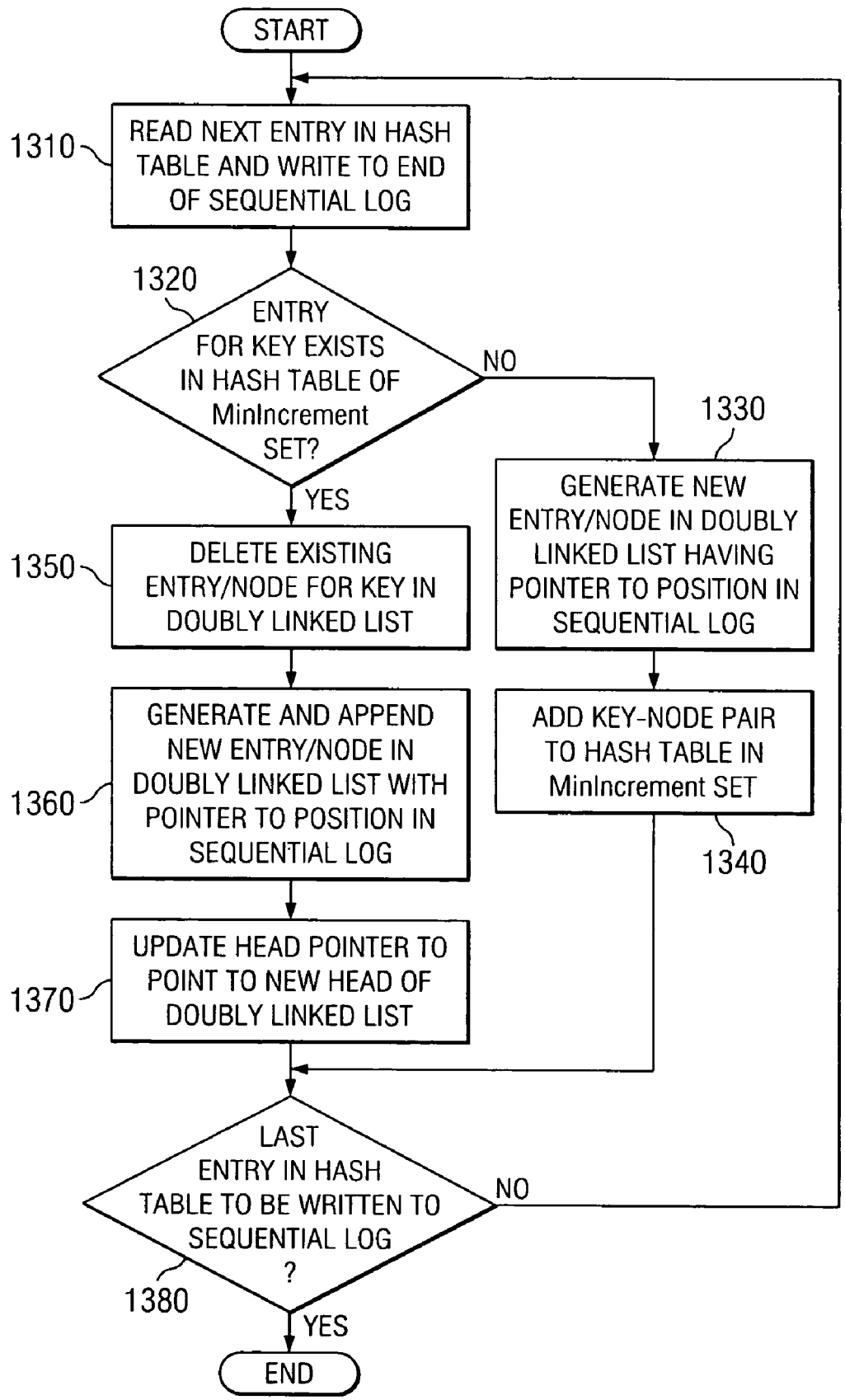
FIG. 13 is a flowchart outlining an exemplary operation for periodically writing the key-value pair information to a sequential log in persistent storage

FIG. 12 is a flowchart outlining an exemplary operation of the present invention when aggregating updates to a key-value pair. FIG. 13 is a flowchart outlining an exemplary operation for periodically writing the key-value pair information to a sequential log in persistent storage. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

As shown in FIG. 12, the exemplary operation for aggregating updates to key-value pairs between writes to persistent storage starts by receiving an update to the data value associated with a key (step 1210). Thereafter, a hash of the key identifier is generated (step 1220) and a lookup of the hashed key identifier in a hash table is performed (step 1230). If an entry corresponding to the hashed key identifier exists, the data value associated with the update is stored in associated with the entry (step 1240). If an entry corresponding to the hashed key identifier does not exist, a new entry is added to the hash table identifying the hashed key identifier and the corresponding data value (step 1250). The operation then terminates. This operation may be repeated with each update to a key-value pair.

With regard now to FIG. 13, as shown, the exemplary operation for periodically writing key-value pair information from a hash table to persistent storage starts by reading a next entry in the hash table and writing it to an entry at the end of a sequential log in persistent storage (step 1310). A determination is then made as to whether an entry for the key corresponding to the entry in the hash table is present in a hash table of a minimum increment set data structure (step 1320). If not, then a new entry/node is created in a doubly linked list having a pointer to the position at which the entry was written in the sequential log (step 1330). A key-node pair entry is then added to the hash table of the minimum increment set data structure (step 1340).

If an entry for the key corresponding to the entry in the hash table is present in the hash table of the minimum increment set data structure, then the entry/node in the doubly linked list for that key is deleted (step 1350). A new entry/node pointing to the position at which the entry was written in the sequential log is generated and appended to the doubly linked list (step 1360). The head pointer is updated to point to the new head of the doubly linked list (step 1370).

A determination is then made as to whether all entries from the hash table have been written to the sequential log in persistent storage (step 1380). If not, the operation returns to step 1310. Otherwise, the operation terminates.

Thus, the present invention provides a mechanism for storing checkpoints for key-value pairs using a sequential log. The mechanisms of the present invention are well suited for intermittent writing of data to persistent storage and for data that will seldom be read. Thus, the mechanisms of the present invention are especially well suited for applications in which soft checkpoints are necessary to maintain state information for applications and processes.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for storing data organized as key-value pairs, comprising:

aggregating data, that does not need to be saved every time the data changes, in memory, the agggregation taking place between write operations to persistent storage;

periodically writing changed portions of the aggregated data to persistent storage in a sequential manner;

updating a data structure to point to locations in the persistent storage where a most recent value for each key of one or more key-value pairs of the changed portions of the data is stored, wherein updating the data structure includes updating a linked list of the data structure to include pointers to locations in the persistent storage where the most recent value for each key of the one or more key-value pairs of the changed portions of the data is stored, and wherein updating the linked list of the data structure includes:

determining, for each key of the one or more key-value pairs, if an entry for the key exists in a first hash table associated with the data structure, wherein entries in the first hash table are associated with keys of the key-value pairs of the data and contain pointers to entries in the linked list corresponding to the same keys;

identifying a linked list entry in the linked list corresponding to the entry in the first hash table, if the first hash table has an entry for the key; and overwriting a pointer value stored in the linked list entry with a new pointer that points to the most recent location in persistent storage where a value associated with the key is stored.

2. The method of claim 1, wherein aggregating data includes maintaining only a latest value associated with one or more key-value pair of the data that have changed since a last write operation to the persistent storage, in entries of a second hash table.

3. The method of claim 2, wherein writing changed portions of the aggregated data to persistent storage in a sequential manner includes writing values associated with the entries of the second hash table to a sequential log in persistent storage.

4. The method of claim 2, wherein maintaining only a latest value associated with one or more key-value pairs of the data includes:

applying a hash function to keys of the one or more key-value pairs to identify entries in the second hash table corresponding to the keys; and overwriting any existing values in the entries in the second hash table with updated values associated with the one or more key-value pairs, such that only the most recently updated values associated with the keys of the one or more key-value pairs is maintained in the entries in the second hash table.

5. The method of claim 1, wherein updating the linked list of the data structure includes:

generating a new linked list entry in the linked list if the first hash table does not have an entry for the key;

storing a pointer in the new linked list entry, wherein the pointer points to a location in the persistent storage where a most recent value associated with the key is stored; and generating a new entry in the first hash table having a pointer to the new linked list entry.

6. The method of claim 1, wherein the location in the persistent storage where the most recent value associated with the key is stored is a location within a sequential log maintained in persistent storage.

7. The method of claim 6, further comprising:
updating a head pointer in the data structure that points to a head of the linked list such that the head pointer points to an earliest position in the sequential log that contains most recent data for a key in the key-value pairs of the data.

8. The method of claim 6, further comprising:
reclaiming one or more portions of the sequential log that contain values for key-value pairs that no longer contain most recent values for the key-value pairs.

9. The method of claim 3, further comprising:
detecting a failure requiring recovery of the data; and
replaying the key-value pairs in the sequential log in order, to thereby recover the data.

10. A computer-readable storage medium having containing computer-executable instructions for storing data organized as key-value pairs, the computer program product comprising:
instructions for aggregating data, that does not need to be saved every time the data changes, in memory, the aggregation taking place between write operations to persistent storage;
instructions for periodically writing changed portions of the aggregated data to persistent storage in a sequential manner;
instructions for updating a data structure to point to locations in the persistent storage where a most recent value for each key of one or more key-value pairs of the changed portions of the data is stored, wherein the instructions for updating the data structure include instructions for updating a linked list of the data structure to include pointers to locations in the persistent storage where the most recent value for each key of the one or more key-value pairs of the changed portions of the data is stored, and wherein the instructions for updating the linked list of the data structure includes:
instructions for determining, for each key of the one or more key-value pairs, if an entry for the key exists in a first hash table associated with the data structure, wherein entries in the first hash table are associated with keys of the key-value pairs of the data and contain pointers to entries in the linked list corresponding to the same keys;
instructions for identifying a linked list entry in the linked list corresponding to the entry in the first hash table, if the first hash table has an entry for the key; and
instructions for overwriting a pointer value stored in the linked list entry with a new pointer that points to the most recent location in persistent storage where a value associated with the key is stored.

11. The computer program product of claim 10, wherein the instructions for aggregating data include instructions for maintaining only a latest value associated with one or more key-value pair of the data that have changed since a last write operation to the persistent storage, in entries of a second hash table.

12. The computer program product of claim 11, wherein the instructions for writing changed portions of the aggregated data to persistent storage in a sequential manner include instructions for writing values associated with the entries of the second hash table to a sequential log in persistent storage.

13. The computer program product of claim 11, wherein the instructions for maintaining only a latest value associated with one or more key-value pairs of the data include:
instructions for applying a hash function to keys of the one or more key-value pairs to identify entries in the second hash table corresponding to the keys; and
instructions for overwriting any existing values in the entries in the second hash table with updated values associated with the one or more key-value pairs, such that only the most recently updated values associated with the keys of the one or more key-value pairs is maintained in the entries in the second hash table.

14. The computer program product of claim 10, wherein the instructions for updating the linked list of the data structure include:
instructions for generating a new linked list entry in the linked list if the first hash table does not have an entry for the key;
instructions for storing a pointer in the new linked list entry, wherein the pointer points to a location in the persistent storage where a most recent value associated with the key is stored; and
instructions for generating a new entry in the first hash table having a pointer to the new linked list entry.

15. The computer program product of claim 10, wherein the location in the persistent storage where the most recent value associated with the key is stored is a location within a sequential log maintained in persistent storage.

16. The computer program product of claim 15, further comprising:
instructions for updating a head pointer in the data structure that points to a head of the linked list such that the head pointer points to an earliest position in the sequential log that contains most recent data for a key in the key-value pairs of the data.

17. The computer program product of claim 15, further comprising:
instructions for reclaiming one or more portions of the sequential log that contain values for key-value pairs that no longer contain most recent values for the key-value pairs.

18. The computer program product of claim 12, further comprising:
instructions for detecting a failure requiring recovery of the data; and
instructions for replaying the key-value pairs in the sequential log in order, to thereby recover the data.

19. An apparatus for storing data organized as key-value pairs, comprising:
a processor;
a memory coupled to the processor; and
a persistent storage coupled to the processor, wherein the processor aggregates data, that does not need to be saved every time the data changes, in the memory, the aggregation taking place between write operations to persistent storage, and periodically writes changed portions of the aggregated data to the persistent storage in a sequential manner, wherein the processor updates a data structure in memory to point to locations in the persistent storage where a most recent value for each key of one or more key-value pairs of the changed portions of the data is stored, wherein the processor updates the data structure by updating a linked list of the data structure to include pointers to locations in the persistent storage where the most recent value for each key of the one or more key-value pairs of the changed portions of the data is stored, and wherein the processor updates the linked list of the data structure by:

determining, for each key of the one or more key-value pairs, if an entry for the key exists in a first hash table associated with the data structure, wherein entries in the first hash table are associated with keys of the key-value pairs of the data and contain pointers to entries in the linked list corresponding to the same keys;

identifying a linked list entry in the linked list corresponding to the entry in the first hash table, if the first hash table has an entry for the key; and overwriting a pointer value stored in the linked list entry with a new pointer that points to the most recent location in persistent storage where a value associated with the key is stored.

20. The apparatus of claim 19, wherein the processor aggregates data by maintaining only a latest value associated with one or more key-value pair of the data that have changed since a last write operation to the persistent storage, in entries of a second hash table in the memory.

21. The apparatus of claim 20, wherein the processor writes changed portions of the aggregated data to the persistent storage in a sequential manner by writing values associated with the entries of the second hash table to a sequential log in persistent storage.

22. The apparatus of claim 20, wherein the processor maintains only a latest value associated with one or more key-value pairs of the data by:

applying a hash function to keys of the one or more key-value pairs to identify entries in the second hash table corresponding to the keys; and overwriting any existing values in the entries in the second hash table with updated values associated with the one or more key-value pairs, such that only the most recently updated values associated with the keys of the one or more key-value pairs is maintained in the entries in the second hash table.

23. The apparatus of claim 19, wherein the processor updates the linked list of the data structure by:

generating a new linked list entry in the linked list if the first hash table does not have an entry for the key;

storing a pointer in the new linked list entry, wherein the pointer points to a location in the persistent storage where a most recent value associated with the key is stored; and generating a new entry in the first hash table having a pointer to the new linked list entry.

24. The apparatus of claim 19, wherein the location in the persistent storage where the most recent value associated with the key is stored is a location within a sequential log maintained in the persistent storage.

25. The apparatus of claim 24, wherein the processor updates a head pointer in the data structure that points to a head of the linked list such that the head pointer points to an earliest position in the sequential log that contains most recent data for a key in the key-value pairs of the data.

26. The apparatus of claim 24, wherein the processor reclaims one or more portions of the sequential log that contain values for key-value pairs that no longer contain most recent values for the key-value pairs.

27. The apparatus of claim 21, wherein the processor detects a failure requiring recovery of the data and replays the key-value pairs in the sequential log in order, to thereby recover the data.

* * * * *